United States Patent
Byrne

(10) Patent No.: US 9,654,454 B2
(45) Date of Patent: *May 16, 2017

(54) COERCED ENCRYPTION ON CONNECTED DEVICES

(71) Applicant: Dropbox, Inc., San Francisco, CA (US)

(72) Inventor: Sean Byrne, Oakland, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/828,210

(22) Filed: Aug. 17, 2015

(65) Prior Publication Data

US 2015/0358299 A1 Dec. 10, 2015

Related U.S. Application Data

(63) Continuation of application No. 13/957,003, filed on Aug. 1, 2013, now Pat. No. 9,141,811.

(51) Int. Cl.
| | |
|---|---|
| H04L 9/12 | (2006.01) |
| H04L 29/06 | (2006.01) |
| G06F 21/60 | (2013.01) |
| H04L 29/08 | (2006.01) |
| G06F 21/78 | (2013.01) |
| G06F 21/88 | (2013.01) |

(52) U.S. Cl.
CPC ......... *H04L 63/0457* (2013.01); *G06F 21/60* (2013.01); *G06F 21/78* (2013.01); *G06F 21/88* (2013.01); *H04L 63/0272* (2013.01); *H04L 63/0853* (2013.01); *H04L 67/1095* (2013.01)

(58) Field of Classification Search
CPC ....................................................... H04L 9/12
See application file for complete search history.

(56) References Cited

U.S. PATENT DOCUMENTS 8,320,558 B1 11/2012 Zea
8,416,954 B1 4/2013 Raizen et al.
(Continued)

OTHER PUBLICATIONS

International Searching Authority, "Search Report" in application No. PCT/US2014/044795, dated Oct. 1, 2014, 10 pages.
(Continued)

*Primary Examiner* — Josnel Jeudy
(74) *Attorney, Agent, or Firm* — Hickman Palermo Becker Bingham LLP

(57) ABSTRACT

Techniques for coercing users to encrypt synchronized content stored at their personal computing devices. In some aspects, one or more computing devices receive, from a personal computing device, an indication of whether data stored in at least a portion of a storage device of the personal computing device is protected by disk encryption. In response to determining, based on the indication, that the portion of the storage device is not protected by encryption, synchronization data for synchronizing a copy of one or more synchronized content items stored in the portion of the storage device with another copy of the synchronized content items stored at one or more server computing devices is withheld from the personal computing device until disk encryption on the personal computing device is enabled so as to coerce the user to enable disk encryption on the personal computing device.

20 Claims, 6 Drawing Sheets

(56) References Cited

U.S. PATENT DOCUMENTS

| | | | |
|---|---|---|---|
| 9,015,858 B2* | 4/2015 | Stamos | H04L 63/04 380/278 |
| 2005/0171872 A1 | 8/2005 | Burch et al. | |
| 2007/0195959 A1 | 8/2007 | Clarke | |
| 2008/0170690 A1* | 7/2008 | Tysowski | H04L 51/14 380/270 |
| 2009/0327710 A1* | 12/2009 | Yoshizawa | G11B 20/00086 713/162 |
| 2010/0281272 A1 | 11/2010 | Ohta | |
| 2011/0004941 A1 | 1/2011 | Mendez et al. | |
| 2012/0185683 A1* | 7/2012 | Krstic | G06F 21/44 713/2 |
| 2012/0185933 A1* | 7/2012 | Belk | G06F 21/88 726/17 |
| 2013/0024917 A1* | 1/2013 | Han | G06Q 10/10 726/5 |
| 2013/0067243 A1* | 3/2013 | Tamayo-Rios | G06F 21/44 713/193 |
| 2014/0053229 A1* | 2/2014 | Saib | G06F 21/10 726/1 |
| 2014/0281574 A1* | 9/2014 | Webb | G06F 21/74 713/189 |
| 2014/0325234 A1* | 10/2014 | Shiyafetdinov | G06F 21/602 713/182 |
| 2015/0040235 A1 | 2/2015 | Byrne | |

OTHER PUBLICATIONS

Claims in Application No. PCT/US2014/044795, dated Oct. 2014, 5 pages.

"Using In-Memory Encrypted Database on the Cloud" 2011 IEEE (pp. 30-37).

Australian Patent Office, "Search Report" in application No. 2014296756, dated Aug. 5, 2016, 3 pages.

Australian Claims in application No. 2014296756, dated Aug. 2016, 4 pages.

U.S. Appl. No. 13/957,003, filed Aug. 1, 2013, Office Action, Dec. 31, 2014.

U.S. Appl. No. 13/957,003, filed Aug. 1, 2013, Notice of Allowance, May 18, 2015.

\* cited by examiner

COERCED ENCRYPTION ON CONNECTED DEVICES

BENEFIT CLAIM

This application claims the benefit under 35 USC §120 as a continuation of application Ser. No. 13/957,003, filed Aug. 1, 2013, the entire contents of which is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The disclosed embodiments relate generally to computing devices, and more particularly, to coercing encryption of digital content synchronized across computing devices.

BACKGROUND

Historically, businesses and organizations have stored sensitive computer data on back office network file servers that were typically accessible only from workstation computers attached to the same local area network as the file server. Preventing loss and theft of sensitive corporate data in these environments was relatively easy because the sensitive data almost never left the bounds of corporate servers and networks.

Today, with the wide-availability of wireless Internet connectivity, virtual private networks (VPNs), and relatively inexpensive mobile and portable personal computing devices such as smart phones, tablet computers, and laptop computers, more and more sensitive corporate data is being stored outside the relatively secure confines of corporate servers and networks. For example, a sales manager may store personal identifying information of customers on his laptop computer or an engineer may store a design specification document for planned product on her mobile phone.

At the same time more and more sensitive data is being stored on portable personal computing devices, accidental loss and theft of such devices is on the rise. By some estimates, as much as a ⅓ of all corporate data breaches are the result of lost or stolen portable computing devices—such as laptops.

One possible solution to prevent breaches of lost or stolen corporate data is to use the disk encryption feature supported by some personal computing devices. Disk encryption, sometimes referred to as full disk encryption (FDE) or whole disk encryption, typically protects sensitive data by encrypting—except for perhaps one or more boot portions—the device's entire hard drive including the device's operating system and applications and data stored on the hard drive. Typically, when the device is booted, the user is prompted for an encryption key, which enables the operating system to boot and run normally. For example, the encryption key may be a password or a pin code. As data is read from the hard disk, it is decrypted and stored in main memory (e.g., random access memory (RAM)). Data written to the hard disk is also encrypted on the fly as it is stored. Without access to the encryption key, data stored on the hard drive is inaccessible to thieves.

Unfortunately, the disk encryption feature of many personal computing devices is optional, often requiring manual activation by a user. Corporations and organizations can adopt a policy requiring employees to turn on the disk encryption feature of the devices that store corporate data. However, compliance with the policy may be limited. For example, some employees may not know how to configure their devices for disk encryption or simply do not want to take the time to configure their devices. A corporate IT administrator can manually configure an employee's device to use disk encryption. However, a savvy employee or an unwitting employee may subsequently turn off disk encryption. Moreover, for a large organization or business, it may impractical to burden the IT department with manually configuring all employee devices with disk encryption. As a result of all this, use of disk encryption to secure sensitive corporate data stored on employee devices is currently limited or scattered.

Accordingly, there is a need for more efficient and more reliable devices and methods for coercing users to encrypt sensitive data stored on their personal computing devices. Such devices and methods may complement or replace conventional devices and methods for coercing users to encrypt sensitive data stored on their personal computing devices.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The above deficiencies and other problems associated with coercing users to encrypt sensitive data stored on their personal computing devices are reduced or eliminated by the disclosed devices and methods.

In accordance with one embodiment, a method is performed by one or more computing devices. The method includes receiving, from a personal computing device having a storage device, an indication of whether at least a portion of the storage device is protected by disk encryption. The portion of the storage device stores a copy of one or more synchronized content items. The method further includes determining, based on the indication, whether the portion of the storage device is protected by disk encryption. If the portion of the storage device is not protected by disk encryption, then synchronization data for synchronizing one or more synchronized content items stored in the portion of the storage device with one or more synchronized content items stored on one or more server computing devices is withheld from the personal computing device. If the portion of the storage device is protected by disk encryption, then the synchronization data may be sent to the personal computing device assuming there are no other conditions on sending the synchronization data to the personal computing device that have not been met.

In another embodiment, if the portion of the storage device is not protected by disk encryption, then data for instructing a user of the personal computing device how to enable disk encryption for at least the portion of the storage device is sent to the personal computing device.

In yet another embodiment, the method further includes performing, after withholding the synchronization data from the personal computing device, receiving, from the personal computing device, another indication of whether at least the portion of the storage device is protected by disk encryption. In response to receiving the other indication, it is determined, based on the other indication, whether the portion of the storage device is protected by disk encryption. If, based on the other indication, the portion of the storage device is protected by disk encryption, then synchronization data for synchronizing the one or more synchronized content items stored in the portion of the storage device with the one or more synchronized content items stored on the one or more server computing devices is sent to the personal computing device.

In yet another embodiment, if the portion of the storage device is not protected by disk encryption, then data identifying one or more content items, of the one or more content items stored in the portion of the storage device, to be removed from the storage device is sent to the personal computing device.

In yet another embodiment, the method further includes performing, prior to receiving the indication from the personal computing device, receiving configuration data for configuring a disk encryption policy associated with the personal computing device. The configuration data indicates that disk encryption of at least the portion of the storage device is required in order to receive synchronization data for synchronizing the one or more synchronized content items stored in the portion of the storage device with the one or more synchronized content items stored on one or more server computing devices.

In yet another embodiment, the disk encryption policy is associated in a database with a record of the personal computing device, an account record of a user of the personal computing device, or a record of a group of accounts of which one account belongs to a user of the personal computing device.

In yet another embodiment, the withheld synchronization data pertains to changes to the one or more synchronized content items stored on the one or more server computing devices that were made since a last successful synchronization between the one or more synchronized content items stored in the portion of the storage device and the one or more synchronized content items stored on the one or more server computing devices.

In yet another embodiment, the method further includes providing a user interface that allows an administrator to configure a disk encryption policy applicable to the personal computing device.

In yet another embodiment, the user interface allows the administrator to apply the configured disk encryption policy to the personal computing device, to a user of the personal computing device, or to a group of users of which a user of the personal computing device is a member.

The yet another embodiment, the indication is received from a synchronization client application installed on the personal computing device.

Thus, devices are provided with more efficient and more reliable methods for coercing users to encrypt synchronized sensitive data stored on their personal computing devices. Such devices and methods may complement or replace conventional devices and methods for forcing users to encrypt sensitive data stored on their personal computing devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF EMBODIMENTS

Figure 1:
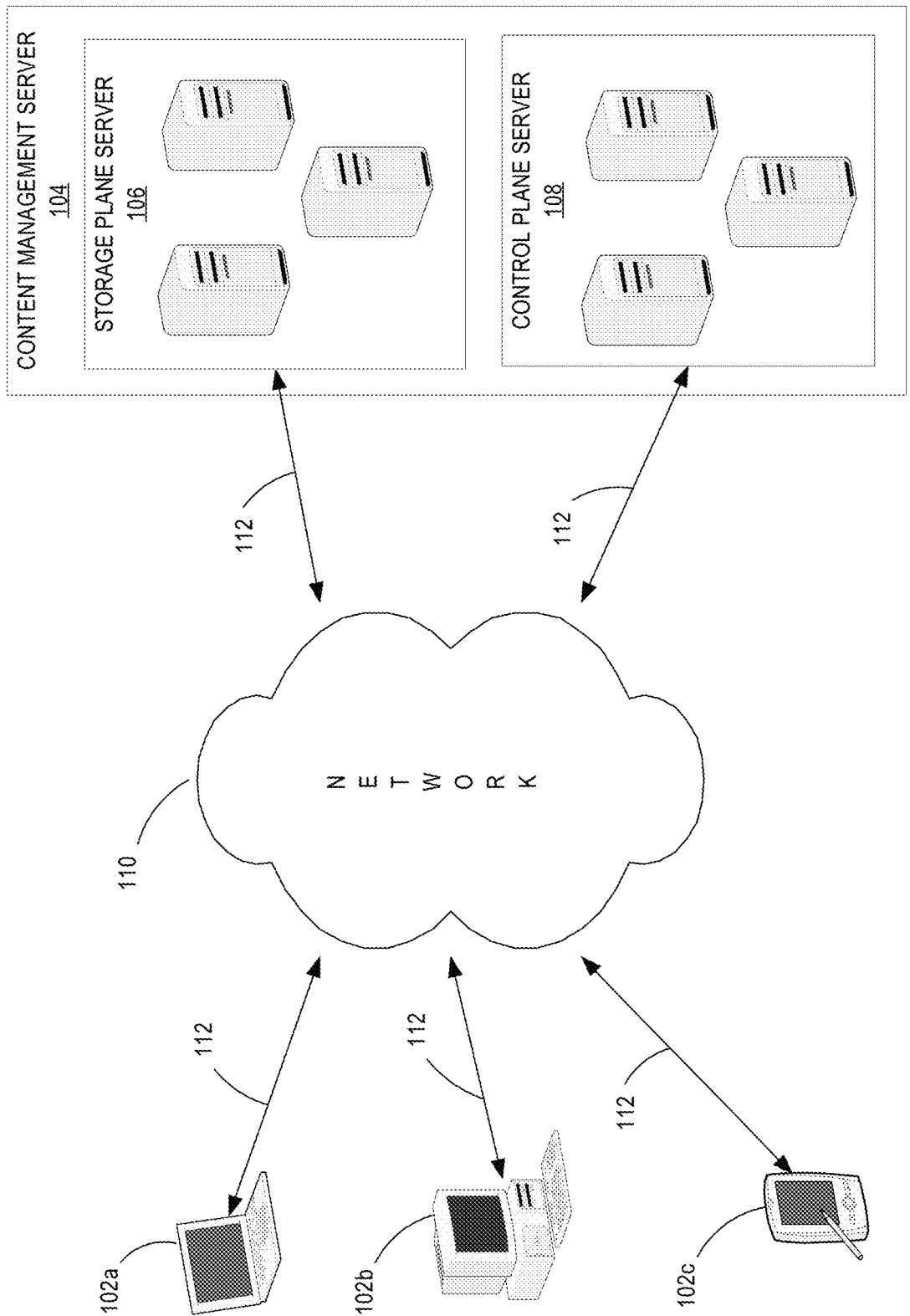
FIG. 1 is a diagram illustrating an environment in which embodiments of the invention can operate.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Overview

Embodiments of the present invention relate to devices and methods for coercing users to encrypt synchronized content stored at their personal computing devices. More particularly, embodiments of the invention relate to requiring activation of disk encryption on personal computing devices before sending data to the personal computing devices for updating the synchronized content stored on the personal computing devices. By requiring disk encryption, updated synchronized content is stored at the personal computing devices in an encrypted format. This encrypted format provides greater protection against data breaches in the event the personal computing devices are lost or stolen.

In one aspect, the present invention relates to devices and methods for determining whether disk encryption is currently enabled for a personal computing device. Such determining may include receiving an indication from the personal computing device that disk encryption is or is not currently enabled. For example, the indication may be received in a network message sent from the personal computing device.

Another aspect of the present invention relates to devices and methods for determining whether to send data to a personal computing device for updating synchronized content stored at the personal computing device or whether to withhold the synchronization update from the personal computing device. Such determination may be based on whether disk encryption is currently enabled for the personal computing device. In particular, in some embodiments, if disk encryption is currently enabled for the personal computing device, then the synchronization update is sent to the personal computing device. However, if disk encryption is not currently enabled for the personal computing device, then the synchronization update is withheld from the personal computing device (i.e., not sent to the personal computing device). By withholding synchronization update from the personal computing device, the user of the personal computing device does not receive updates to synchronized content until disk encryption is enabled thereby coercing the user to enable disk encryption so that synchronization updates can be received. In some embodiments, when disk encryption is not currently enabled, instead of sending data for updating synchronized content stored at the personal computing device, data for instructing a user of the personal computing device how to enable disk encryption for the personal computing device is sent instead.

Yet another aspect of the present invention relates to providing user interfaces to an administrator user for selectively configuring a disk encryption policy for a group of users. For example, the group of users may all be employees of the same company or may all belong to the same division or department within an organization or company. The disk encryption policy can specify which personal computing devices among the group of users will be required to have disk encryption enabled to receive synchronization updates. Through the user interfaces, the administrator can set the disk encryption policy on:

- a per-device basis such that disk encryption for a selected personal computing device must be enabled before the selected personal computing device can receive synchronization updates,
- a per-user basis such that each personal computing device of a selected user storing synchronized content is required to have disk encryption enabled before the personal computing device can receive synchronization updates, or
- a per-group basis such that each personal computing device of each user in the group storing synchronized content is required to have disk encryption enabled before the personal computing device can receive synchronization updates.

Another aspect of the present invention relates to providing user interfaces to a user for selectively configuring a disk encryption policy for the user's own personal computing devices.

The foregoing and other embodiments, objects, aspects, features, and advantages of the invention will become more apparent from the following description.

Exemplary Operating Environment

In FIG. 1, environment 100 in which embodiments of the invention can operate to coerce encryption of synchronized content include one or more first computing devices ("personal computing devices") 102a, 102b, and 102c (generally 102) and one or more second computing devices (collectively referred to herein as "content management server") 104 which includes one or more third computing devices (collectively referred to herein as "storage plane server") 106 and one or more fourth computing devices (collectively referred to herein as "control plane server") 108.

In the following description, content management server 104 refers to storage plane server 106 and control plane server 108 generally. Further, although storage plane server 106 and control plane server 108 are illustrated in FIG. 1 as separate sub-sets of the computing devices of content management server 104, it should be understood that one or more computing devices of storage plane server 106 may be the same computing devices as one or more computing devices of control plane server 108. Indeed, content management server 104, including storage plane server 106 and control plane server 108, may be implemented on a single computing device. Thus, the separate sub-sets of computing devices in FIG. 1 should be regarding more as a logical separation of content management server 104 functionality rather than a physical one. However, storage plane server 106 may be physically separate from control plane server 108. For example, storage plane server 106 may be housed in a separate data center or other hosting facility from control plane server 108.

Personal computing devices 102 and content management server 104 are in communication with network 110 using communication channels 112. In some embodiments, network 110 involves the Internet. However, network 110 need not involve the Internet. For example, network 110 may involve only a local area network (LAN), such a company intranet, office network, or home network.

Communication channels 112 connect personal computing devices 102 and content management server 104 to network 110. Communication channels 112 can be wired (e.g., twisted pair, coaxial cable, ITU-T G.hn, optical fiber, etc.) or wireless (e.g., microwave, satellite, radio-wave, infrared, etc.). Different personal computing devices 102 may use different types of communication channels 112 or the same type of communication channel 112 to connect to network 110. For example, personal computing device 102a may connect to network 110 over wired Ethernet while personal computing devices 102b and 102c may connected to network 110 over a IEEE 801.11b-based radio network. Similarly, personal computing devices 102 and content management server 104 may use different types of communications channels 112 or the same type of communication channel 112 to connect to network 110. In some embodiments where network 110 involves the Internet, content management server 104 is housed in one or more data center facilities providing relatively high-bandwidth communication channels 112 to network 110 and personal computing devices 102 connect to network 110 using relatively lower bandwidth communication channels 112.

Communication between personal computing devices 102 and content management server 104 over network 110 can occur according to one or more of a variety of different networking communication protocols (e.g., TCP/IP, UDP, HTTP, HTTPS). In some embodiments, personal computing devices 102 and content management server 104 encrypt some or all communications when communication with each other over network 110. For example, such communications may be encrypted using TSL, SSL, or other networking layer encryption scheme.

Each of personal computing devices 102 can be virtually any computing device used to access network 110 and content management system 104. Personal computing devices 102 can be stationary (e.g., workstation, desktop, kiosk computers, server computers) or portable (e.g., laptop computers, mobile phones, smart phones, tablet computers). Personal computing devices 102 can be configured with an operating system (e.g., WINDOWS NT-based, WINDOWS MOBILE, FREEBSD, LINUX, MAX OS X, NETBSD, OPENBSD, DRAGON FLY BSD, ANDROID, IOS). Further, personal computing devices 102 can be configured with software-based or hardware-based disk encryption capabilities. However, some personal computing devices 102 may not have disk encryption capabilities while others do. Thus, it not a requirement of the invention that all personal computing devices 102 have disk encryption capabilities.

While three personal computing devices 102 are shown in environment 100, more or less than three personal computing devices 102 may exist in environment 100 in other embodiments. Further, personal computing devices 102 can be used by different users and multiple personal computing devices 102 can be used by the same user.

Disk Encryption

Generally, when enabled on a computing device, disk encryption cryptographically encrypts, using a symmetric-key algorithm, data stored on the computing device's mass storage device (e.g., a hard disk, a solid state drive, a SD card, a flash drive, or other non-volatile computer storage disk, drive, card, or device). The disk encryption capability of the computing device may encompass multiple of the computer device's mass storage devices (e.g., two or more of a hard disk, a solid state drive, a SD card, a Universal Serial Bus (USB) device). Thus, while embodiments hereinafter refer to storage device in the singular, the singular forms "a storage device" and "the storage device" are intended to include the plural forms as well.

Typically, all data stored on the storage device is encrypted except for perhaps a small portion of the storage device where software and data for booting the computing device is stored. For example, the master boot record of the storage device may not be encrypted.

Typically, when the computing device boots, an external encryption key (e.g., a username/password combination, a pin code, a biometric, etc.) is input as part of a pre-operating system boot authentication process which is then used to decrypt data stored on the storage device and load the operating system stored thereon. While the operating system is running, data written to the storage device is encrypted as it is written to the storage device and data read from the storage device is decrypted as it is read from the storage device. Thus, all such data, when stored on the storage device, is encrypted at all times, even when the computing device is powered off, so long as disk encryption is enabled.

Disk encryption is distinct from, but may be used in conjunction with, file encryption (sometimes referred to as "content encryption"). With file encryption, one or more individual files or folders of a file system are selected by a user for encryption. In contrast, with disk encryption, the entire disk, partition, or volume, including file system metadata stored thereon, is encrypted. For example, a user may enable disk encryption for a particular partition of a disk where a sensitive file is stored. The user may additionally enable file encryption for the sensitive file. This results in two levels of encryption for the sensitive file. In one level, the sensitive file is encrypted by disk encryption when stored on the particular partition of the disk. In another level, the contents of the sensitive file are encrypted by file encryption. Typically, disk encryption and file encryption use separate encryption keys. Thus, with the sensitive file example, one encryption key may be used by disk encryption to encrypt/decrypt the particular partition where the sensitive file is stored and another encryption key may be used by file encryption to encrypt/decrypt the contends of the sensitive file.

Example Operation

As an illustration of how one embodiment of the invention may operate in environment 100, a user installs content synchronization software (referred to hereinafter as "sync client") on his or her personal computing device 102a. The sync client is configured to periodically synchronize copies of one or more synchronized content items stored on a storage device of the personal computing device 102a with copies of one or more synchronized content items stored on storage plane server 106. Periodically in this context means on a regular interval and/or in response to a change or changes to a content item copy or content item copies stored at the personal computing device 102a or the storage plane server 106. For the purposes of providing clear examples, the set of one or more synchronized content items stored on the storage device of the personal computing device 102a is referred to hereinafter as the "client set" and the set of one or more synchronized content items stored on storage plane server 106 is referred to hereinafter as the "server set". Other personal computing devices 102 (e.g., 102b and/102c) may store other client sets that are synchronized with the same server set.

For example, personal computing devices 102a and 102b may be used by a first user and personal computing device 102c may be used by a second user. Personal computing devices 102a, 102b, and 102c may each store a client set each representing a set of synchronized content items the first user and the second user are working on collaboratively and that are synchronized with one another through a corresponding server set stored on storage plane server 106.

Registration Request

After installation on personal computing device 102a, the sync client contacts control plane server 108 in a registration request to register the device 102a with content management server 104. The registration request may contain device identification information (or just "device identifier") such as, for example, an alphanumeric character sequence that content management server 104 can use for registration purposes and to track device 102a. The registration request may also contain user account identification information (or just "account identifier") such as, for example, an e-mail address or an alphanumeric character sequence that directly or indirectly identifies a user account with content management system 104 held by a user of device 102a. For security purposes, the account identifier and/or the device identifier may be encoded and/or encrypted in the registration request as part of a security or authentication token.

Disk Encryption Information

The registration request may also contain disk encryption information. The disk encryption information may indicate whether the portion of the storage device where the client set is stored is currently protected by disk encryption (i.e., disk encryption is currently enabled for at least the portion). The portion of the storage device where the client set is stored may correspond to a partition or volume of the storage device or the entire storage device. However, the client set may not consume the entire storage space of the portion. For example, the disk encryption information may indicate that the entire storage device (save for some boot portions) is protected by disk encryption, yet the client set may be stored in only a small portion of the entire storage space of the storage device.

The disk encryption information can indicate whether the portion of the storage device where the client set is set is protected by disk encryption in a variety of different ways. For example, the disk encryption information may include a binary or Boolean value indicating with one value (e.g., 1 or TRUE) that the portion of the storage device is protected by disk encryption and indicating with another different value (e.g., 0 or FALSE) that the portion of the storage device is not protected by disk encryption. Alternatively, the disk encryption information may include raw disk encryption and client set information from which control plane server 108 can determine whether the client set is protected by disk encryption. For example, the raw disk encryption information may specify partitions or volumes of the storage device that are protected by disk encryption and partitions or volumes of the storage device where the client set is stored.

In some embodiments, the disk encryption information indicates whether the device 102a is disk encryption capable. Such information may be used for configuring disk encryption policies. For example, such information may be presented to a user in a user interface for selecting which personal computing devices should be required to have disk encryption enabled. It should be noted that disk encryption information can indicate that device 102a is disk encryption capable and also indicate that the portion of the storage device where the client set is stored is not currently protected by encryption. For example, the disk encryption capability of the device 102a may not currently be enabled.

The sync client may obtain the disk encryption information or information from which the disk encryption information is derived using an application programming interface (API) of the underlying operating system of the device 102a. Typically, the particular API used to obtain this information will vary between different operating systems. For example, an ANDROID operating system may offer a different API for obtaining this information than an IOS operating system.

Registration States

In response to receiving the registration request, control plane servers 108 can use the disk encryption information in the registration request to determine whether the device 102a should be registered in a partially registered state or a fully registered state. In the partial registration state, content management server 104 will withhold (i.e., not send) updates to the server set from the device 102a. However, device 102a may receive other data and services from content management server 104 in the partially registered state. In the fully registered state, device 102a may receive updates to the server set from content management server 104. Devices 102 that are partially registered and devices 102 that are fully registered may be indicated as such in user interfaces provided by content management system 104.

Disk Encryption Policy

Determination of whether the device 102a should be registered partial or full can be based on a disk encryption policy. The policy may be associated with a group of accounts, an individual account, or individual device. For example, the policy association may be stored in a database part of or accessible to control plane server 108.

When associated with a group of accounts, the policy may specify that all fully registered devices of all accounts in the group are required to have disk encryption enabled. Accordingly, when a registration request is received for an account that is in the group, control plane server 108 determines whether the device 102a sending the request should be partially registered or fully registered based on the disk encryption information in the registration request and the disk encryption policy associated with the group of account. For example, if the disk encryption policy requires disk encryption to be enabled and the disk encryption information in the registration request indicates that disk encryption is not enabled, then control plane server 108 registers the device 102a as partially registered.

When associated with an individual account, the disk encryption policy may specify that all registered devices of the account are required to have disk encryption enabled. For example, if a user registers two devices 102a and 102b, the disk encryption policy associated with the user's account may require all of the user's devices 102 to have disk encryption enabled. For example, if the user attempts to register a new device 102c after partially or fully registering devices 102a and 102b, the disk encryption policy associated with the user's account would require that the new device 102c also have disk encryption enabled.

When associated with an individual device 102, the disk encryption policy may specify that the individual device 102 is required to have disk encryption enabled. For example, a disk encryption policy requiring disk encryption can be associated portable devices 102 (e.g., cell phones, smart phones, tablets, laptops) that are more likely to be lost or stolen then stationary devices 102 (e.g., workstations and desktop computers).

Withholding Synchronization Data

According to some embodiments, the user of a personal computing device 102a is coerced into enabling disk encryption for at least the portion of the storage device of the personal computing device 102a where the client set is stored by withholding synchronization data for updating the client set with recent updates to the server set. The withheld synchronization data can be any content item data or synchronization metadata thereof used by the sync client to synchronize content items of the client set with content items of the server set. For example, control plane server 108 may withhold (i.e., not send) synchronization data used by the sync client to determine which content items (or portions thereof) of the client set are out-of-date with respect to the server set. As another example, control plane server 104 may withhold (i.e., not send) synchronization data used by the sync client to determine which content item data to download from storage plane server 106 for updating content items of the client set. In some embodiments, such withheld synchronization data identifies a block or blocks of a content item or content items of the server set. In some embodiments, a content item block is up to four (4) megabytes in size.

Changes to Applicable Disk Encryption Policy

The disk encryption policy applicable to a personal computing device 102 may change over time. For example, when device 102a registers with control plane server 108, the disk encryption policy applicable to device 102a may not require disk encryption at the time of registration. However, an administrator may subsequently change the applicable disk encryption policy to require disk encryption for device 102a at a later time thereafter.

In some embodiments, control plane server 108 checks the disk encryption policy applicable to a device 102a every time the sync client on the device 102a initiates synchronization with control plane server 108. As mentioned, such synchronization may be initiated by the sync client on a periodic basis for the purposes of keeping the client set synchronized with the server set either on a regular interval and/or after changes to one or both of the client set and sever set. The control plane server 108 withholds synchronization data depending on the then current setting of the disk encryption policy. In this way, if the applicable disk encryption policy is changed to require disk encryption after the device 102a registers with control plane server 108, the user can still be coerced into enabling disk encryption on the device 102a by withhold synchronization data pertaining to changes to the server set that were made after the applicable disk encryption policy is changed.

Removing Unprotected Content Items

In some embodiments, the disk encryption policy applicable to a device 102a may be configured by an administrator to remove selected content items of the client set from the device 102a when the disk encryption policy requires disk encryption to be enabled and disk encryption is not currently enabled on the device 102a. By removing such "unprotected" content items from the device 102a, the unprotected content items are not stored on the device 102a unencrypted against the display encryption policy.

In some embodiments, control plane server 108 instructs the sync client to remove selected content items of the client set from the device 102a after determining that the device 102a's current disk encryption configuration is in violation of the disk encryption policy. For example, control plane server 108 may instruct the sync client to remove content items from the client set in response to a registration request or in response to the sync client initiating a synchronization. Control plane server 108 may also push a remove command to the sync client over a long-lived network connection. For example, control plane server 108 may push the remove command using a HyperText Transfer Protocol (HTTP) long-polling technique.

It should be noted that removal of selected content items from the client set may only be temporary. For example, if the device 102a is subsequently configured to enable disk encryption, then the removed content items may be restored to the device 102a at the next synchronization with the server set. Also, removing the content items from the client set may not remove the corresponding content items from the server set.

Enabling Disk Encryption

In some embodiments, when the disk encryption policy applicable to a device 102a requires disk encryption and the device 102a does not have disk encryption enabled, in addition to withholding synchronization data from the device 102a, control plane server 108 sends information pertaining to instructing the user of device 102a to enable disk encryption on the device 102a. Such instructional information sent by control plane server 108 can be an indication that instructions for enabling disk encryption should be presented to the user or the actual instructions themselves. The instructional information may be received by the sync client on the device 102a which can then act on the information. For example, the sync client can cause a web browser installed on the device 102a to launch and present a web page that presents information for enabling disk encryption on the device 102a.

Figure 2:
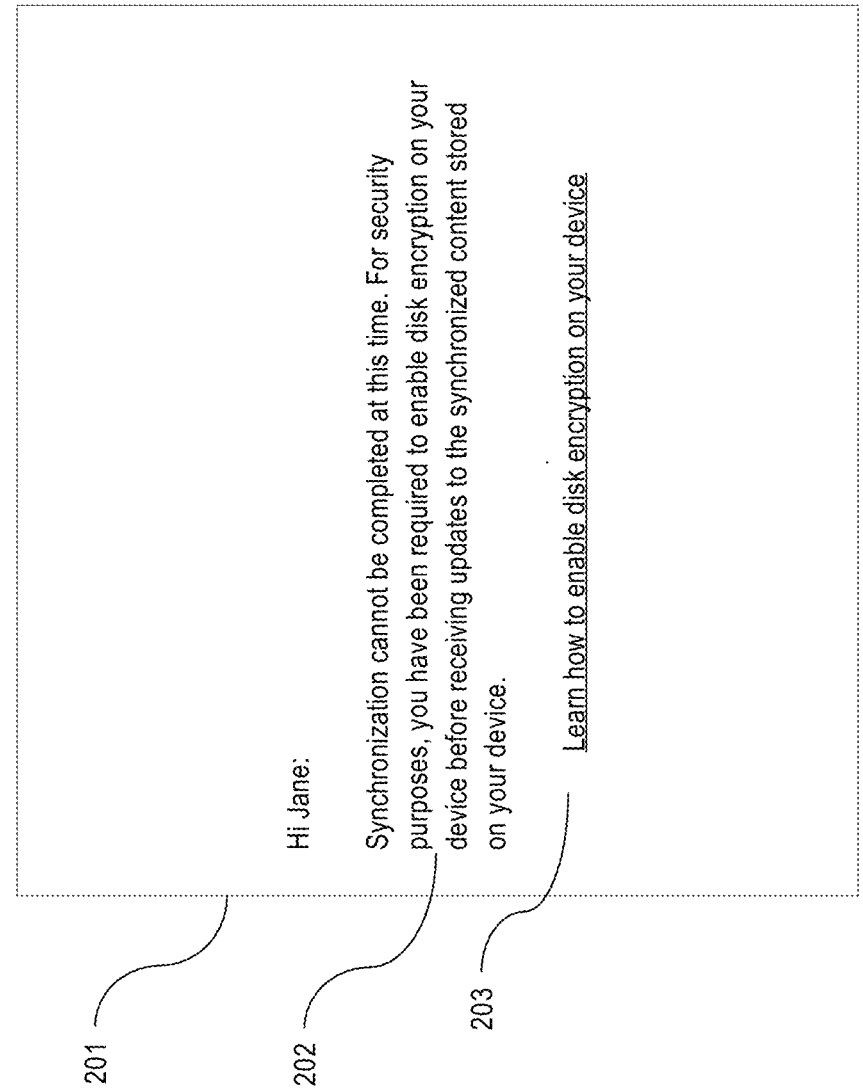
FIGS. 2-5 are a wireframe mock-ups of a possible user interfaces.

FIG. 2 is a wireframe mock-up of a possible web page window 201 that can be displayed to the user of a device 102a for instructing the user how to enable disk encryption. Window 201 may be displayed in response to receiving instructional information from control plane server 108 after control plane server 108 has determined that synchronization data should be withheld from the device 102a according to the applicable disk encryption policy. Window 201 includes a text message 202 explaining to the user that synchronization between the client set stored at device 102a and the server set stored on storage plane server 106 cannot be completed because the disk encryption is not enabled on the device 102a. The window 201 also include a link 203 which, when activated, provides detailed instructions to the user for enabling disk encryption on the device 102a. For example, the link 203, when activated, could present another web page with the detailed instructions.

Figure 3:
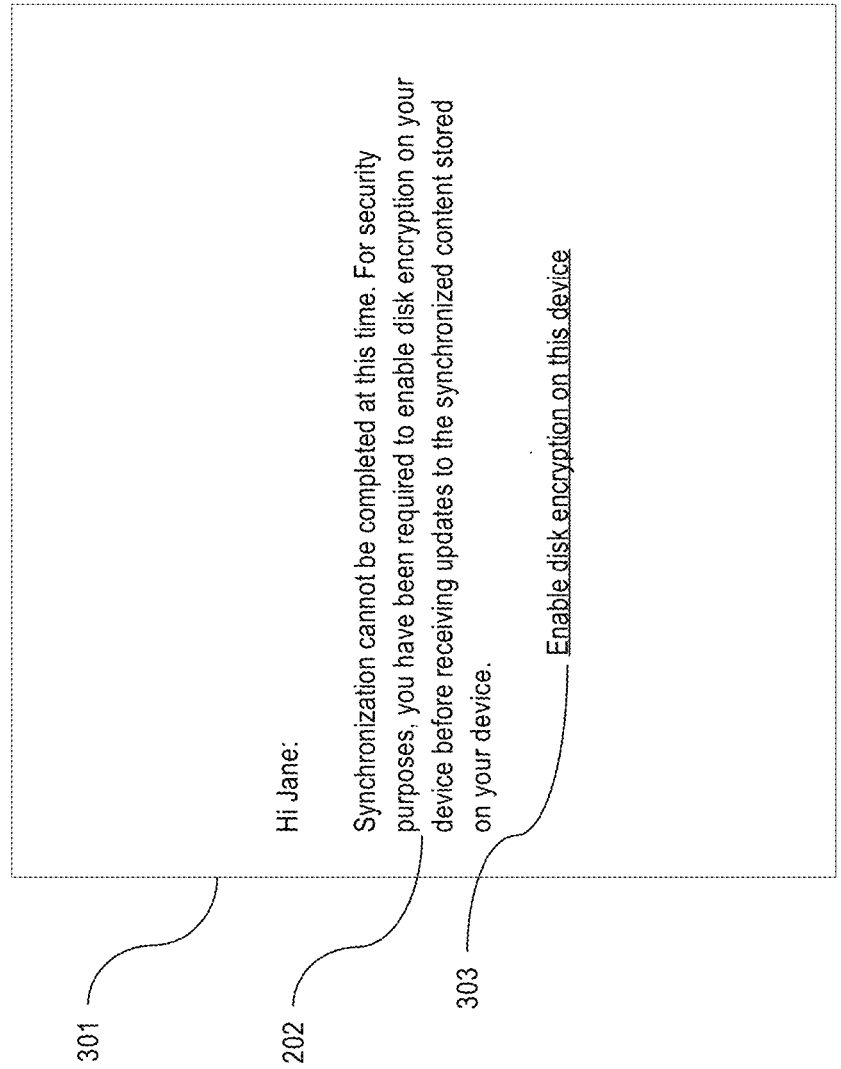

For some devices 102, it may be possible to automatically enable disk encryption for the user. For example, the operating system on the device 102a may offer an Application Programming Interface (API) which can be invoked or called to enable disk encryption on the device 102a. For these devices 102, the web page window displayed in response to receiving instructional information from control plane server 108 may provide a link that the user can activate to automatically enable disk encryption. A wireframe mock-up example of such a window is shown in FIG. 3. Here, window 301 includes the same text message 202 as shown in window 201 of FIG. 2 but instead of a link that provides further detailed instructions to the user on how to manually enable disk encryption when activated, link 303 is provided. Link 303, when activated, causes disk encryption to be automatically enabled on the device 102a. For example, activation of link 303 can cause the sync client or other software program installed on the device 102 to invoke the operating system API for enabling disk encryption on the device 102a. Note that even though link 303 automatically enables disk encryption for the user, some user interaction may be required to configure the device 102a with disk encryption. For example, the user may be prompted to enter an encryption key password during the enablement process.

Configuring Disk Encryption Policies

In some embodiments, content management server 104 provides a web-based user interface that allows an administrator user to selectively configure disk encryption policies applicable to a group of users. The administrator user may be responsible for administering the disk encryption policies for the group of users on behalf of a company or organization, for example. The group of users may be members or employees of the company or organization. As mentioned previously, through the user interfaces, the administrator can set the disk encryption policy on:

a per-device basis,
a per-user basis, or
a per-group basis.

Figure 4:
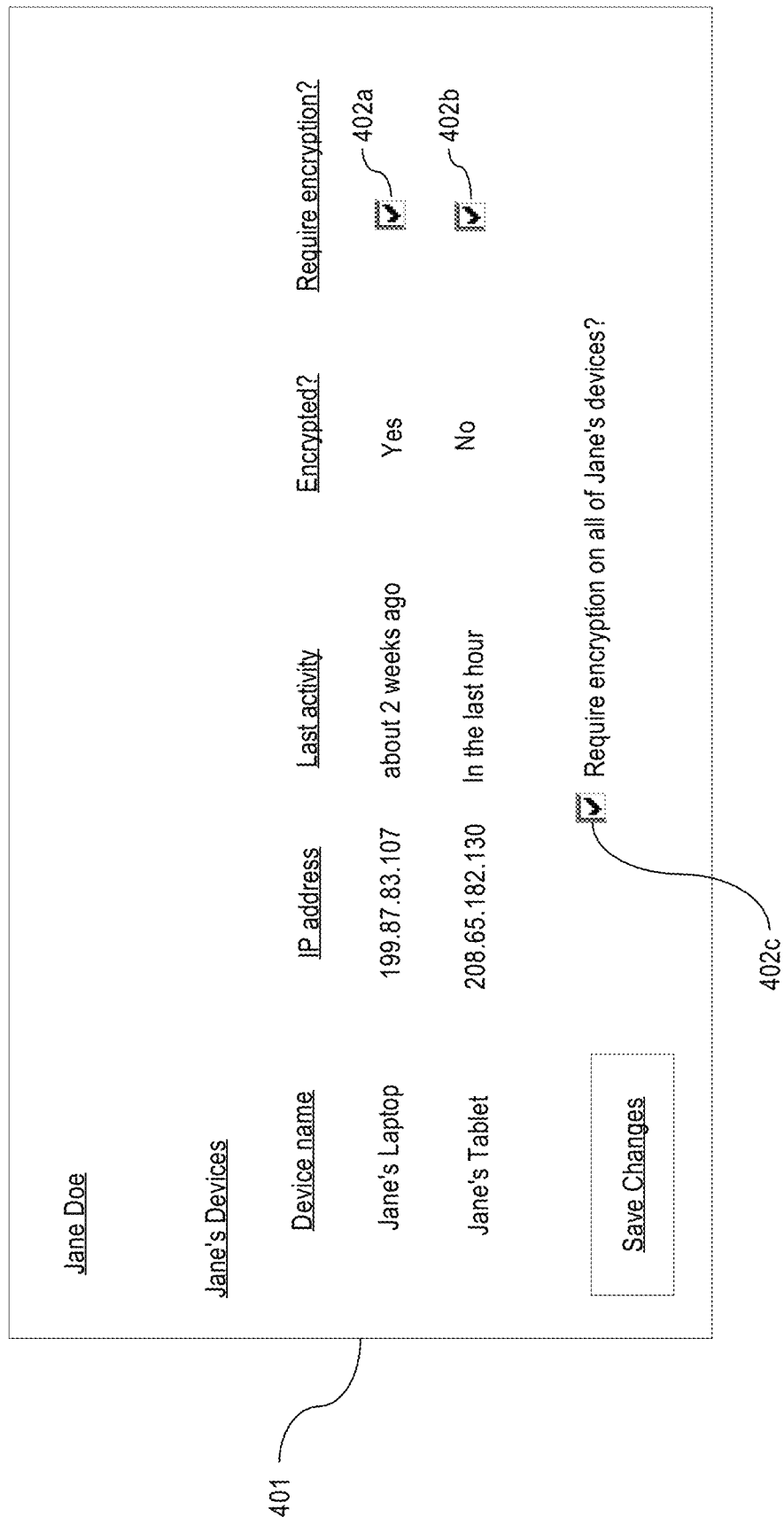

FIG. 4 is a wireframe mock-up of a possible web-based user interface for configuring disk encryption policy on a per-device basis or a per-user basis. Here, user interface 401 provides detailed information on a member (Jane) of a group of users that another user administers. The user interface 401 lists the devices 102 Jane has registered (either partially or fully) with content management server 104.

Although not shown in FIG. 4, user interface 401 can also indicate whether each registered device is partially or fully registered. For example, a registration status icon, text, or other registration status indicator can be displayed on user interface 401 in the row corresponding to a device listing to indicate the current registration status.

User interface 401 indicates whether disk encryption is currently enabled on Jane's registered devices based on the latest indication received from the devices. In this example, disk encryption is currently enabled on Jane's laptop but not on Jane's tablet.

User interface 401 also provides a number of checkboxes 402 for selectively requiring disk encryption. In particular, the administrator can selectively require disk encryption on a per-device basis by selecting one or both of checkboxes 402a and/or 402b. Specifically, selecting checkbox 402a will require disk encryption on Jane's laptop and selecting checkbox 402b will require disk encryption on Jane's Tablet. Alternatively, the administrator can require disk encryption on a per-user basis for all of Jane's devices including those not yet registered by selecting checkbox 402c.

Figure 5:
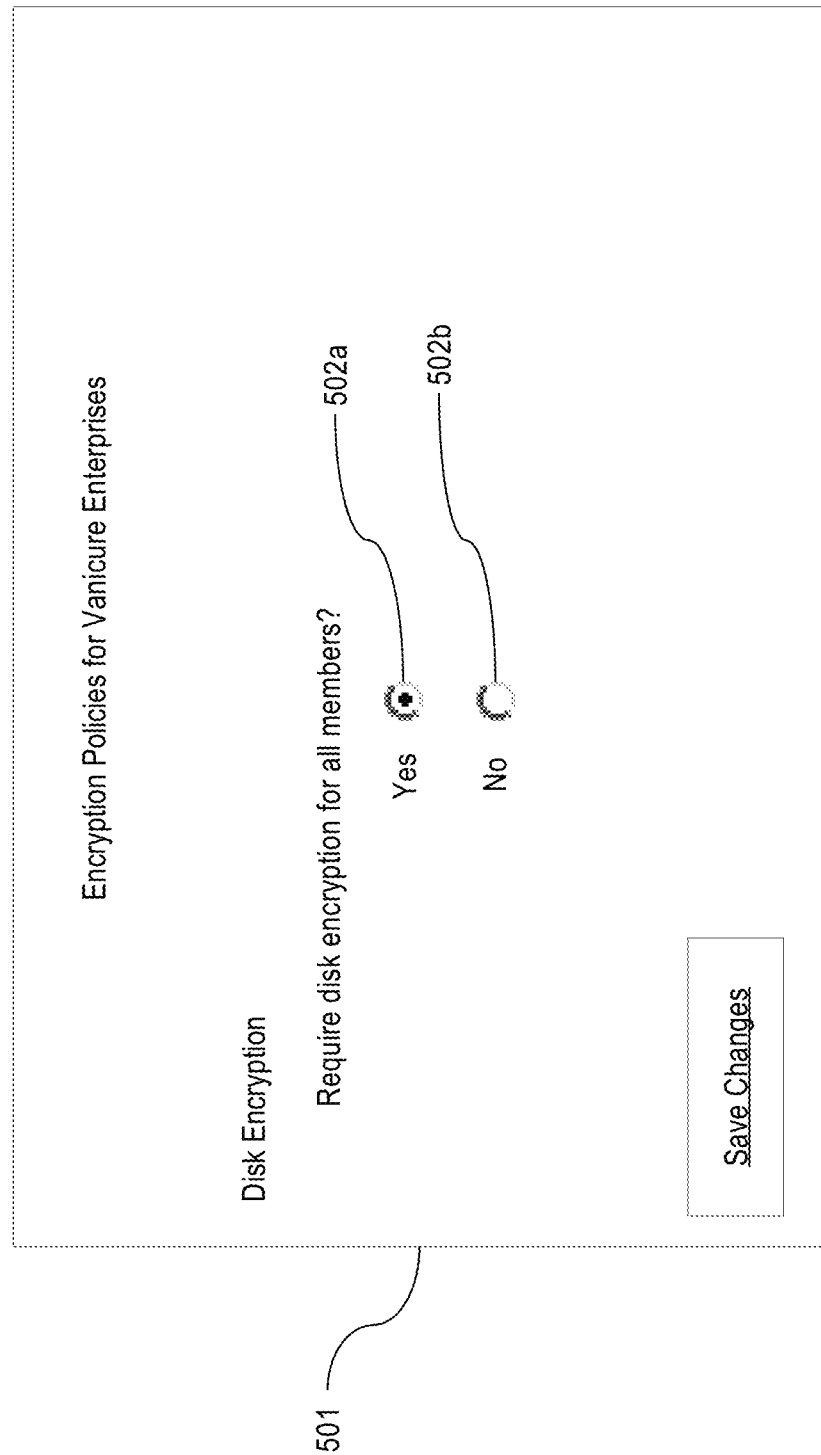

FIG. 5 is a wireframe mock-up of a possible web-based user interface for configuring disk encryption policy on a per-group basis. Here, user interface 501 presents two radio buttons 502a and 502b. The administrator can select radio button 502a to require disk encryption for all current and future members of a group named "Vanicure Enterprises" that the administrator administers disk encryption policies for. Alternatively, the administrator can select radio button 502b if disk encryption is not required.

In some embodiments, content management server 104 provides a web-based user interface that allows a user to selectively configure a disk encryption policy applicable to the user's own personal computing devices. Similar to the administrator user interface of FIG. 4, the user interface can allow the user to require disk encryption for all of the user's devices including the user's devices that have yet to be registered with content management server 104. Alternatively, the user interface can allow the user to require disk encryption on one or more of the user's devices that the user selects. By providing this user interface, a user can effectively set a reminder to enable disk encryption on their devices. Specifically, by withholding synchronization data from devices that the user has configured to require disk encryption, the user is reminded to enable disk encryption on such a device upon noticing or being notified that the device is not receiving synchronization data.

Example Implementing Mechanism

Figure 6:
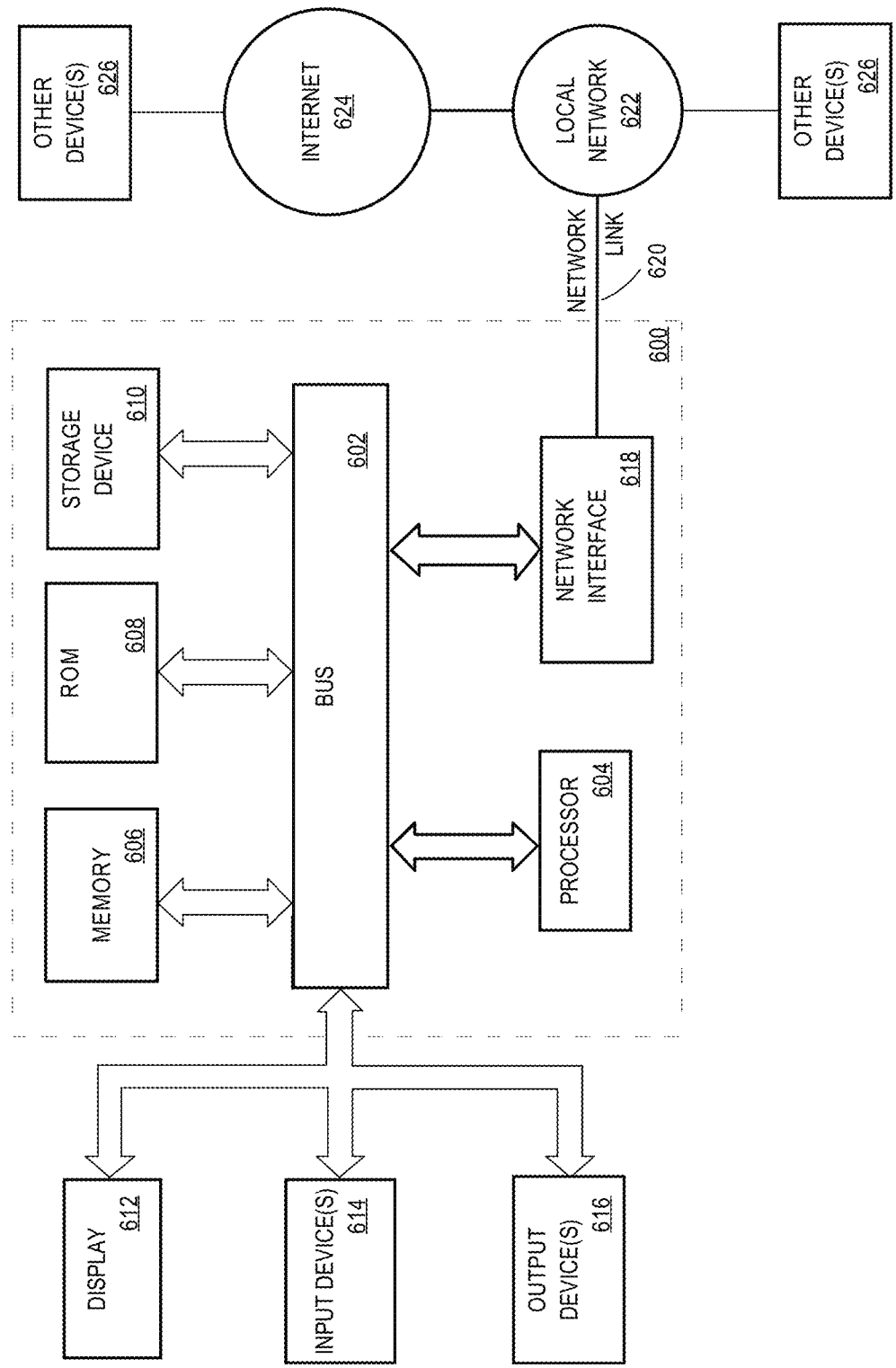
FIG. 6 is a block diagram illustrating a computer system with which embodiments of the invention can be implemented.

FIG. 6 is a block diagram that illustrates a computer system 600 with which embodiments of the present invention can be implemented. Computer system 600 includes bus 602 or other communication mechanism for communicating information and hardware processor (CPU) 604 coupled with bus 602 for processing information. Bus 602 collectively represents all system, peripheral, and chipset buses that communicatively connect the numerous components of computer system 600. Hardware processor 604 may be one or more general purpose microprocessors or a multi-core processor in different implementations.

Computer system 600 also includes memory 606, such as a random access memory (RAM) or other dynamic storage device, coupled to bus 602 for storing information and instructions to be executed by processor 604. Memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604.

Storage device 610, such as a solid state drive, a magnetic disk, or an optical drive, is provided and coupled to bus 602 for storing information and instructions.

Computer system 600 can be coupled via bus 602 to display 612, such as a liquid crystal display (LCD), for displaying information to a computer user.

One or more physical input devices 614, for example an alphanumeric keyboard or other keyboard or keypad, can be coupled to bus 602 for communicating information and command selections to processor 604. Another possible type of input device 614 is a cursor control, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. Yet another possible type of input device 614 is a touch-sensitive surface, such as one that overlays display 612 to form a touch-screen display, for communicating direction and other information and command selections to processor 604. The touch-sensitive surface typically has a sensor or set of sensors that accepts input from a user based on haptic and/or tactile contact.

One or more audio output devices 616, for example headphones and/or audio speakers, can be coupled to bus 602 for outputting audible information to a computer user.

Network interface 618 provides a two-way data communication establishing a network link 620 to a local network 622. Network link 620 may be wired (e.g., an Ethernet wire link) or wireless (e.g., a cellular wireless link or WiFi wireless link). Local network 622 can be a local Area network (LAN), a wide area network (WAN), or other network that is communicatively coupled to the Internet 624 or one or more other data networks for communicating with one or more other computing devices 626 that are also linked to the Internet 624, local network 622, and/or the one or more other data networks.

Computer system 600 can send messages and receive data, including program code, through the network(s) 622 and/or 626, network link 620 and network interface 618. For example, a server 626 might transmit requested code for an application program through the Internet 624, local network 622 and network interface 618. The received code may be executed by processor 604 as it is received, and/or stored in storage device 610, or other non-volatile storage for later execution.

Computer system 600 may implement the techniques described herein using customized hard-wired logic, one or more application specific integrated circuits (ASICs) or filed programmable arrays (FPGAs), firmware and/or program logic which in combination with the computer system causes or programs computer system 600 to be a special-purpose machine.

According to one embodiment, the techniques herein are performed by computer system 600 in response to processor 604 executing one or more sequences of one or more instructions contained in main memory 606. Such instructions may be read into memory 606 from another storage medium, such as storage device 610. Execution of the sequences of instructions contained in memory 606 causes processor 604 to perform the process steps described herein.

In alternative embodiments, hard-wired circuitry may be used in place of or in combination with software instructions.

USAGE OF TERMS AND GLOSSARY

The terminology used in the description of the invention herein and the appended claims is for the purpose of describing or claiming particular embodiments only and is not intended to be limiting of the invention.

As used in the description of the invention and the appended claims, the terms "first", "second", etc. may be used herein to describe various elements, these elements should not be limited by these terms. These terms are only used to distinguish one element from another. For example, a first device could be termed a second device, and, similarly, a second device could be termed a first device, without departing from the scope of the present invention. The first device and the second device are both devices, but they are not the same device.

As used in the description of the invention and the appended claims, the singular forms "a", "an" and "the" are intended to include the plural forms as well, unless the context clearly indicates otherwise.

It will also be understood that the term "and/or" as used in the description refers to and encompasses any and all possible combinations of one or more of the associated listed items.

It will be further understood that the terms "includes," "including," "comprises," and/or "comprising," when used in this specification and the appended claims, specify the presence of stated features, integers, steps, operations, elements, and/or components, but do not preclude the presence or addition of one or more other features, integers, steps, operations, elements, components, and/or groups thereof.

As used this description and the appended claims, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The term "content item" as used herein refers generally to any logical collection of computer data. Data of a content item can be formatted in a variety of different digital content types including document types (e.g., MICROSOFT WORD, PDF, MICROSOFT EXCEL, etc.), image types, (e.g., JPEG, TIFF, GIF, PNG, etc.), audio types (e.g., ACC, MPEG-3, etc.), video types (e.g., MPEG-2, etc.), archive types (e.g., ZIP, etc.), or any other type of computer data.

The term "non-transitory media" as used herein refers to any media that store data and/or instructions that cause a machine to operation in a specific fashion. Such non-transitory media may comprise non-volatile media and/or volatile media. Non-volatile media includes, for example, solid state devices, optical drives, and magnetic disks, such as storage device 610. Volatile media includes dynamic memory, such as memory 606. Common forms of non-transitory media include, for example, floppy disks, flexible disks, hard disks, solid state drives, magnetic tape, CD-ROMs, flash drives, or any other electronic, magnetic, or optical data storage media, and a RAM, a PROM, an EPROM, a FLASH-EPROM, a NVRAM, or any other memory chip or cartridge. Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

In this description, the term "software" and "program" is meant to include firmware, applications, and/or sets of instructions stored in memory, for example memory 606 and/or storage device 610, which can be executed by one or more processors, for example processor 604. In some embodiments, multiple software aspects may be implemented as sub-parts of a larger program while remaining distinct software aspects. In some embodiments, multiple software aspects can be implemented as separate programs. Finally, any combination of separate programs that together implement a software aspect described herein is within the scope of the disclosure. In some embodiments, the software programs, when installed to operate on one or more computing devices, define one or more specific machine implementations that execute and perform the operations of the software programs. A software program (also known as a program, software application (or just application), script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program can correspond to a file in a file system. A program can be stored in a portion of a file that holds other programs or data (e.g., one or more scripts stored in a markup language document), in a single file dedicated to the program in question, or multiple coordinate files (e.g., files that store one or more modules, sub-programs, or portions of code). A computer program can be deployed to execute on one computer or on multiple computers that are located at one site or distributed across multiple sites and interconnected by a communication network.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application and any continuing applications thereof including continuations, continuations-in-part, and divisionals thereof, in the specific form in which such claims issue, including any subsequent correction.

In one alternative embodiment, instead of coercing users to enable disk encryption on their personal computing devices by withholding content item synchronization data, users are coerced to enable anti-virus software, pin code authentication, password authentication, and/or network firewall software on their personal computing devices by withhold content synchronization data.

What is claimed is:

1. A system, comprising:
   one or more processors;
   memory; and
   one or more programs, wherein the one or more programs are stored in the memory for execution by the one or more processors, the one or more programs comprising instructions for:
      receiving, over a network from a personal computing device having a storage device, a first indication that disk encryption is disabled on the storage device;
      wherein the storage device stores one or more content items that are currently unsynchronized with one or more corresponding content items hosted by an online content management service;
      based on the first indication, withholding synchronization data from the personal computing device for synchronizing the one or more content items on the storage device with the one or more corresponding content items hosted by the online content management service until after a second indication is received over the network from the personal computing device that disk encryption is enabled on the storage device; and after the second indication is received over the network from the personal computing device, sending the withheld synchronization data to the personal computing device for synchronizing the one or more content items on the storage device with the one or more corresponding content items hosted by the online content management service;

wherein the withheld synchronization data sent to the personal computing device is encrypted at the personal computing device using disk encryption enabled on the storage device.

2. The system of claim 1, the one or more programs further comprising instructions for:

sending, to the personal computing device, instructions for a user to enable disk encryption for the storage device.

3. The system of claim 1, the one or more programs further comprising instructions for:

based on the first indication, sending data to the personal computing device identifying one or more particular content items, of the one or more content items stored on the storage device, to be removed from the storage device.

4. The system of claim 1, the one or more programs further comprising instructions for:

prior to receiving the first indication from the personal computing device, receiving configuration data for configuring a disk encryption policy associated with the personal computing device, the configuration data indicating that disk encryption of the storage device must be enabled in order to receive synchronization data for synchronizing content items stored on the storage device with corresponding content items hosted by the online content management service.

5. The system of claim 1, wherein the withheld synchronization data pertains to changes to the one or more corresponding content items hosted by the online content management service, the changes having been made to the one or more corresponding content items since a last successful synchronization between the personal computing device and the online content management service.

6. The system of claim 1, the one or more programs further comprising instructions for providing a user interface that allows an administrator to configure a disk encryption policy applicable to the personal computing device.

7. The system of claim 6, wherein the user interface allows the administrator to apply the configured disk encryption policy to the personal computing device, to a user of the personal computing device, or to a group of users of which the user of the personal computing device is a member.

8. The system of claim 1, wherein the first indication is received from a synchronization client application installed on the personal computing device.

9. The system of claim 1, wherein the one or more content items on the storage device are file encrypted.

10. The system of claim 1, the one or more programs further comprising instructions for:

automatically enabling, on the personal computing device, disk encryption on the storage device; and sending the withheld synchronization data to the personal computing device after disk encryption on the storage device is enabled.

11. A method, comprising:

at one or more computing devices comprising one or more processors and memory storing one or more programs executed by the one or more processors to perform the method, performing the operations of:

receiving, over a network from a personal computing device having a storage device, a first indication that disk encryption is disabled on the storage device;

wherein the storage device stores one or more content items that are currently unsynchronized with one or more corresponding content items hosted by an online content management service;

based on the first indication, withholding synchronization data from the personal computing device for synchronizing the one or more content items on the storage device with the one or more corresponding content items hosted by the online content management service until after a second indication is received over the network from the personal computing device that disk encryption is enabled on the storage device; and after the second indication is received over the network from the personal computing device, sending the withheld synchronization data to the personal computing device for synchronizing the one or more content items on the storage device with the one or more corresponding content items hosted by the online content management service;

wherein the withheld synchronization data sent to the personal computing device is encrypted at the personal computing device using disk encryption enabled on the storage device.

12. The method of claim 11, further comprising:

based on the first indication, sending data to the personal computing device identifying one or more particular content items, of the one or more content items stored on the storage device, to be removed from the storage device.

13. The method of claim 11, further comprising:

prior to receiving the first indication from the personal computing device, receiving configuration data for configuring a disk encryption policy associated with the personal computing device, the configuration data indicating that disk encryption of the storage device must be enabled in order to receive synchronization data for synchronizing content items stored on the storage device with corresponding content items hosted by the online content management service.

14. The method of claim 11, wherein the withheld synchronization data pertains to changes to the one or more corresponding content items hosted by the online content management service, the changes having been made to the one or more corresponding content items since a last successful synchronization between the personal computing device and the online content management service.

15. The method of claim 11, further comprising:

providing a user interface that allows an administrator to configure a disk encryption policy applicable to the personal computing device.

16. The method of claim 15, wherein the user interface allows the administrator to apply the configured disk encryption policy to the personal computing device, to a user of the personal computing device, or to a group of users of which the user of the personal computing device is a member.

17. The method of claim 11, wherein the one or more content items on the storage device are file encrypted.

18. The method of claim 11, further comprising:
automatically enabling, on the personal computing device, disk encryption on the storage device; and
sending the withheld synchronization data to the personal computing device after disk encryption on the storage device is enabled.

19. The method of claim 11, further comprising:
sending, to the personal computing device, instructions for a user to enable disk encryption for the storage device.

20. The method of claim 11, wherein the first indication is received from a synchronization client application installed on the personal computing device.

\* \* \* \* \*